Dec. 22, 1959   F. HODGSON   2,918,203
COMBINATION CUP AND STIRRING DEVICE
Filed April 24, 1957
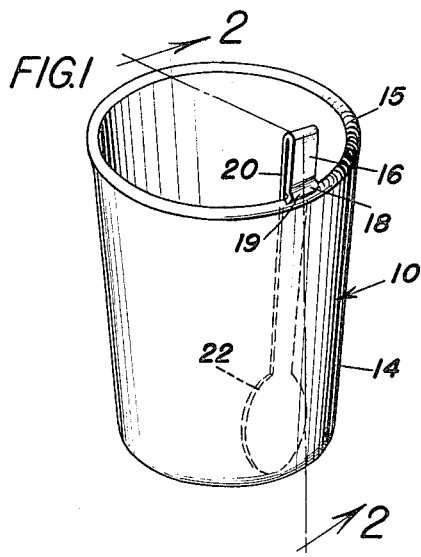
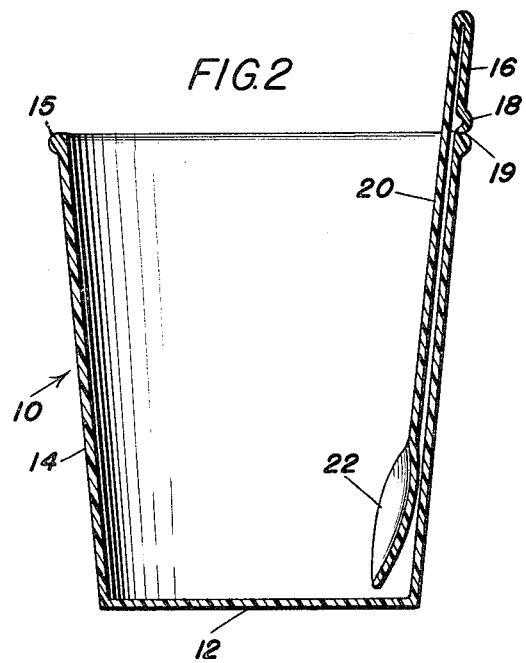
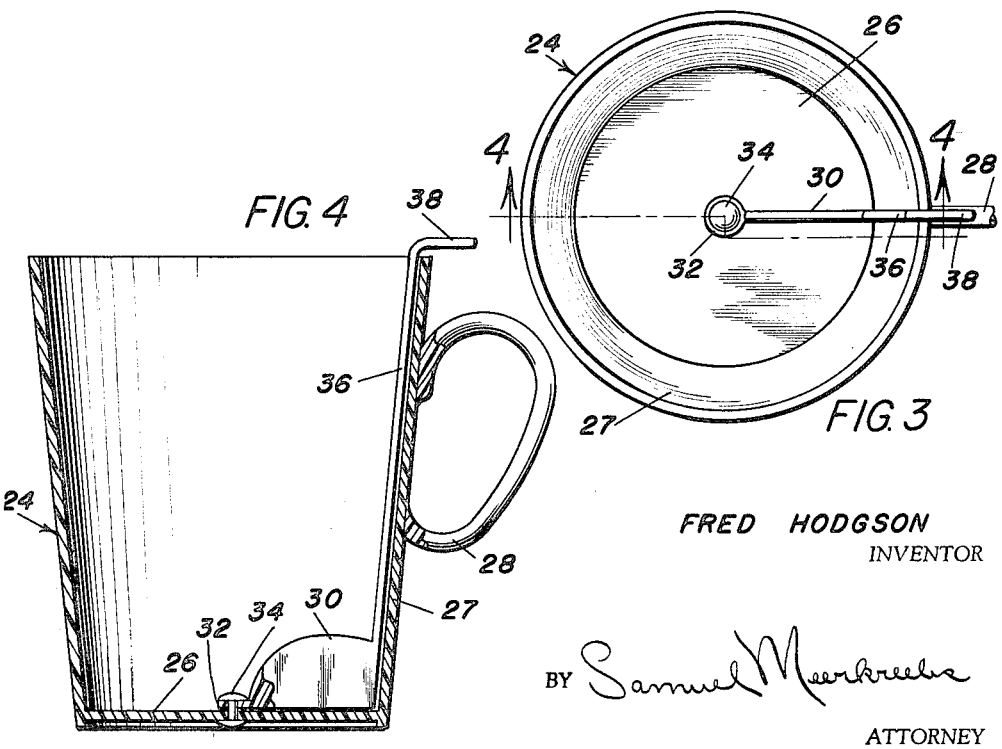
FRED HODGSON
INVENTOR
BY *Samuel Meerkreebs*
ATTORNEY

United States Patent Office 2,918,203
Patented Dec. 22, 1959

2,918,203

COMBINATION CUP AND STIRRING DEVICE

Fred Hodgson, Blue Ridge, Alberta, Canada

Application April 24, 1957, Serial No. 654,818

3 Claims. (Cl. 229—1.5)

The present invention relates to a combination cup and stirring device. The stirrer in one form of the invention, is in the shape of a spoon, so as to be used not only for stirring, but also for the purpose of discharging other functions of a conventional spoon. In another form of the invention, the stirring device is designed to serve solely as a stirring or agitating means, and is so connected to the cup as to be rotatable therein, in a position to effectively agitate the contents of the cup for dissolving sugar, etc.

Conventionally, a spoon or stirrer is a member wholly separate from the cup or similar container. This is inconvenient to a user, and at the same time represents an undesirable expense for manufacturers, particularly for manufacturers of disposable containers such as paper cups. Paper cups are widely used particularly at athletic events or at other entertainments where liquid refreshments are served to the spectators in disposable cups. In such instances, spoons must be manufactured separately from the cups, must be packed separately, and individually supplied to the purchasers of the refreshments. Even in these circumstances, the purchaser suffers inconvenience, due to the necessity of holding both the cup and spoon, one in one hand and one in the other hand, making difficult the stirring of the contents of the cups, especially in large crowds.

In view of the difficulties which have heretofore existed, it is proposed, in carrying out the invention, to provide a combination cup and stirring device, so designed that both of these elements may be manufactured and distributed as a single, combination unit. The stirring device, whether it be a spoon or whether it be designed only for agitation of the contents of the container, is connected to the cup fully from the time of manufacture until the time of use of the container, to provide maximum convenience for the manufacturer, distributor, and ultimate consumer.

A more specific object, in the embodiment of the invention having a spoon-shaped stirring member, is to provide a particular formation of the spoon, and a particular manner of connecting the spoon to the cup, that will facilitate detachment of the spoon from the cup by the ultimate consumer, while at the same time providing a reinforced outer end of the spoon that will tend to maintain the shape of the spoon handle, this being particularly important when the spoon and cup are made of a thin, disposable material such as paper.

A further object, in the second form of the device, is to provide an agitating device or stirrer that will also be adapted for manufacture from disposable material, but will still have a shape that will cause the same to agitate the contents of the cup with maximum efficiency, while occupying a minimum amount of area within the cup so as not to interfere with consumption of the beverage.

Yet another object, in the second form of the invention, is to form the stirrer so that a handle portion will be merged into an agitating head lying in a plane broadside to the path of movement of the head within the cup, the head in turn being formed with a flattened portion rotatably connected to the bottom of the cup, to permit rotation of the stirring member within the cup in a path such that the handle at all times will remain in close proximity to the side wall of the cup, and the head will travel in a circular path immediately above the cup bottom, to dissolve sugar or otherwise agitate the cup contents.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a perspective view of a combination cup and stirring device formed according to the present invention;

Figure 2 is an enlarged sectional view longitudinally of the cup, taken substantially on line 2—2 of Figure 1;

Figure 3 is a top plan view of a modified construction, a portion of the cup handle being broken away; and Figure 4 is a sectional view taken substantially on line 4—4 of Figure 3.

In the form of the invention shown in Figures 1 and 2, the cup has been generally designated at 10. In the illustrated embodiment, the cup, as well as the stirring spoon, is formed of plastic material, and said plastic would be comparatively thin, so as to permit manufacture of the combination cup and stirring device at a cost sufficiently low as to justify manufacture and sale of the device as a single use, disposable product. Alternatively, the cup could be of paper, thin cardboard, or other material used in the manufacture of disposable containers.

In any event, the container 10 includes a flat, circular bottom 12, integral at its periphery with an upwardly flaring side wall 14, and a peripheral rolled edge 15.

The stirring spoon initially is integral with the side wall 14 of the cup, and includes a connecting portion 16 which is formed as an extension of the side wall 14, projecting above the upper end of the cup as shown in Figures 1 and 2. The connecting portion 16, at its base, is provided with a transversely extending, outwardly pressed rib 18, the lower longitudinal edge of which is provided with a weakened line or perforated portion 19 extending in the plane of the top rolled edge of the cup.

At its upper end, the connecting portion 16 merges into a spoon handle 20, extending downwardly in the cup in closely spaced, parallel relation to the side wall 14 and terminating adjacent the bottom 12 in a bowl portion 22.

As will be noted from Figure 2, the connecting portion 16 and handle 20 are in closely spaced, parallel planes, and are almost in face-to-face contact with each other. The connecting portion, in fact, constitutes an outwardly directed return bend portion or extension of the handle 20.

By reason of this arrangement, when the cup, with the spoon attached, is delivered to the ultimate consumer, one merely rocks the connecting portion 16 upon the upper end of the side wall 14, about an axis defined by the weakened line 19. This causes the spoon to be swiftly and easily broken off from the side wall 14, so that it can thereafter be used to discharge the regular functions of a spoon. The connecting portion 16 remains upon the handle 20, and effectively reinforces the handle at the location at which the handle is gripped by the user during the stirring of the cup contents.

If the cup and spoon are of paper material, it may be possible to remove the spoon merely by tearing it along the weakened or perforated line 19. The rib 18 will be utilized as a resilient clip for retaining the spoon on the rolled edge 15 of the cup.

In the form of the invention shown in Figures 3 and 4 the cup and stirring member are again illustrated as being of plastic material. However, again it will be possible to manufacture the device from paper or other cheap, disposable materials.

In this form, the cup has been generally designated at 24, and includes a flat bottom 26 and an upwardly flaring side wall 27.

The cup may be manufactured, as shown in Figure 3, with a handle 28 and it will be understood that a handle could also be provided on the cup shown in Figures 1 and 2. Or, if desired, the handle can be left off the container in the second form of the invention.

The stirring device includes a head 30, having a straight bottom edge in contacting relation to the bottom 26 of the cup, said head having an arcuately upwardly bowed top edge and an outer side edge in closely spaced, parallel relation to side wall 27. The head 30 extends fully from the center point of the bottom 26 to the periphery of said bottom, and at its inner edge, the head is formed with a flattened, circular ear 32 disposed in a plane normal to the plane of the body portion of the head. The plane of the body portion of the head, as will be noted from Figure 3, is perpendicular to the flat plane of the bottom 26, and lies radially of the cup bottom.

A center opening is formed in ear 32, receiving a rivet 34 or equivalent fastening means, thus mounting the head for rotatable movement about the center point of the bottom.

At its outer end, head 30 is integrally formed with an elongated, upwardly projecting, straight handle 36 terminating at its upper end in a radially, outwardly directed extension 38 that is adapted to be grasped by the user for the purpose of rotating the stirring device within the cup. Handle 36 is in closely spaced, parallel relation to the side wall 27 as is readily seen from Figure 4, and accordingly does not occupy any space within the cup that would cause interference with the consumption of the cup's contents.

In the use of the stirring device, the extension 38 is grasped, and is shifted in a direction circumferentially of the upper end of the cup, to cause rotation of the head 30 about the axis defined by the rivet or equivalent connecting means 34. As a result the head 30, which will be broadside to the path in which it is moving, will effectively agitate the contents of the cup, particularly at the bottom where sugar and other dissolvable solids tend to settle. After the contents have been thoroughly stirred, one may drink the beverage without interference from the stirring member.

In both forms of the invention the combination device can be readily manufactured of disposable material, and has the desirable characteristic that the stirring member, whether it be of the spoon type or the agitator type shown in Figures 1 and 4 respectively, will be connected directly to the cup during manufacture, and will remain so connected fully up to the time the device is delivered to the ultimate consumer. This simplifies the manufacture and distribution of cups and stirring means, and the invention thus has particular value in the field of manufacture of disposable containers, since the construction is sufficiently inexpensive to permit manufacture of the combination device from thin, cheap plastic material, paper, etc., with both the stirring device and the cup being discarded after a single use.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A combination container and stirrer comprising a cup-like receptacle; and an enlarged stirring member extending into and having an intermediate connection to the upper edge of said receptacle, said member including an enlarged portion at one end thereof disposed adjacent the bottom of the receptacle, a handle extending upwardly from said enlarged portion along the inner side wall of the receptacle, said handle projecting above the upper edge of the receptacle, and a connecting portion integrally connecting the upper edge of the receptacle to the projecting portion to provide said connection to the stirring member of said receptacle, the connecting portion at the point of its connection to the receptacle permitting rocking movement thereabout for stirring the contents of the cup and comprising a weakened part for detachment of the stirring member from the receptacle.

2. A combination container and stirrer as in claim 1, wherein the weakened part of the connecting portion extends transversely of the connecting portion in the plane of the upper end of the receptacle.

3. A combination container and stirrer comprising a cup-like receptacle; and a stirring member extending into and having a connection to said receptacle, said member including an enlarged portion at one end thereof disposed adjacent the bottom of the receptacle, a handle extending upwardly from said large portion adjacent a side wall of the receptacle, said handle projecting above the upper end of the receptacle, and a connecting portion integrally connecting the upper end of the receptacle to the projecting portion to provide said connection to the stirring member of said receptacle, the connecting portion at the point of its connection to the receptacle having a weakened part for detachment of the stirring member from the receptacle, the connecting portion being formed as a return bend extension of the handle.

References Cited in the file of this patent

UNITED STATES PATENTS

| | | |
|---|---|---|
| 700,653 | Jobson | May 20, 1902 |
| 760,589 | Vallandingham | May 24, 1904 |
| 826,427 | Hoeglauer | July 17, 1906 |
| 1,607,864 | Butler | Nov. 23, 1926 |
| 2,205,726 | Lehman | June 25, 1940 |
| 2,478,962 | Ziehmer | Aug. 16, 1949 |